Oct. 6, 1959   ZEN-ICHI INOTSUME   2,907,168
PALLET TYPE ESCAPE MECHANISM FOR TIME PIECES
Filed Aug. 21, 1956   3 Sheets-Sheet 1
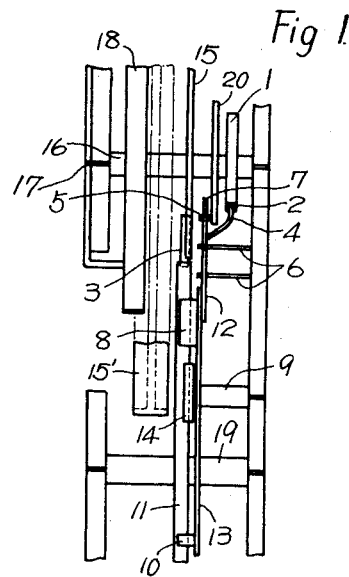
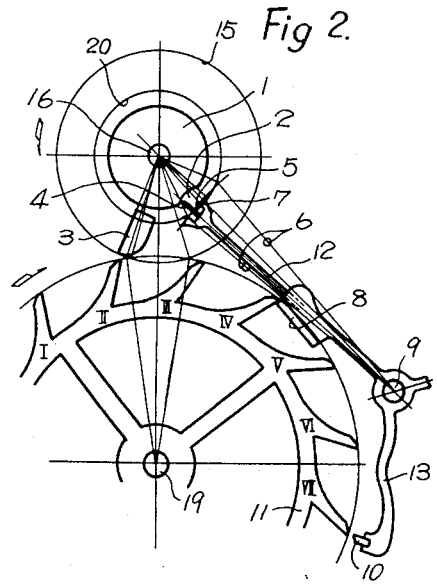
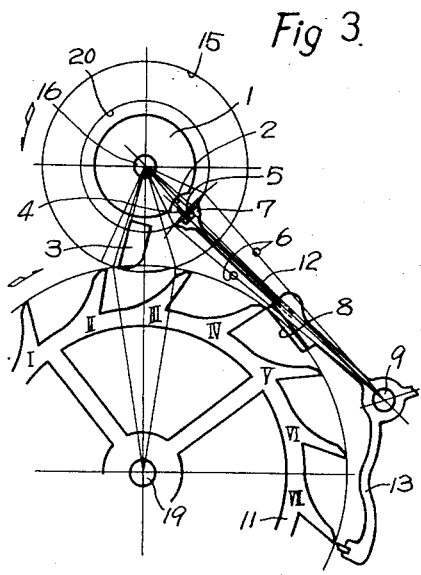
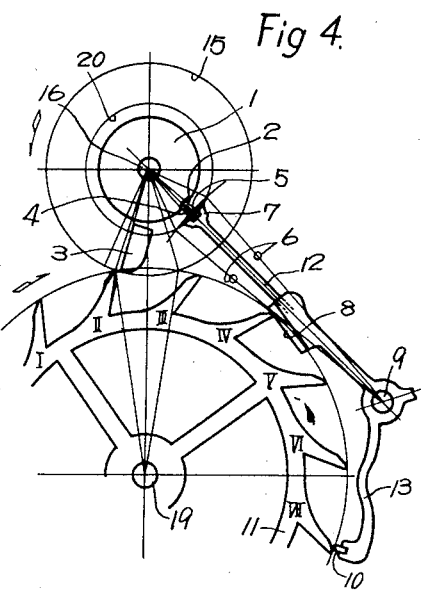
INVENTOR.
Zen-ichi Inotsume
BY
Michael S. Striker
Agent Oct. 6, 1959
ZEN-ICHI INOTSUME
2,907,168
PALLET TYPE ESCAPE MECHANISM FOR TIME PIECES
Filed Aug. 21, 1956
3 Sheets-Sheet 3
Fig 9.
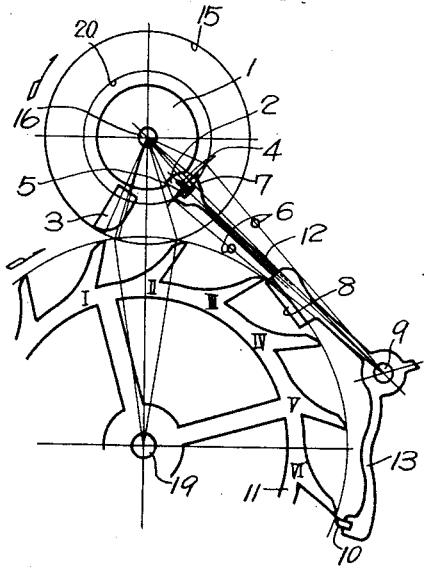
Fig 10.
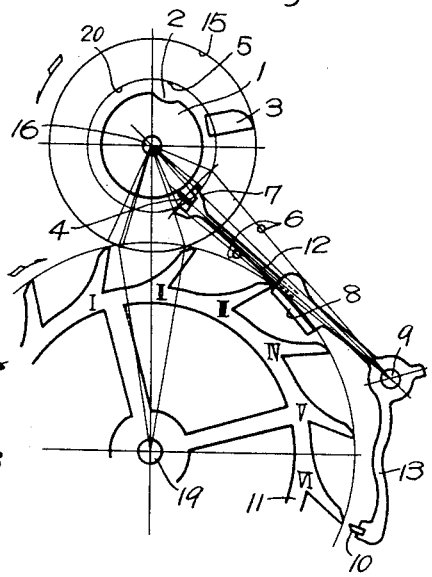
PRIOR ART. Fig 11.
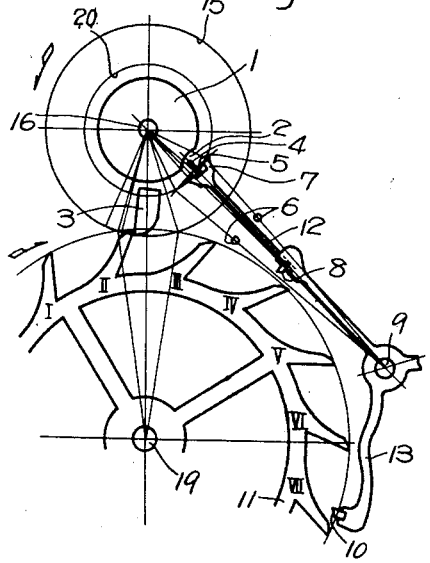
INVENTOR.
Zen-ichi Inotsume
BY
Michall S. Striker
Agent United States Patent Office 2,907,168
Patented Oct. 6, 1959

2,907,168

PALLET TYPE ESCAPE MECHANISM FOR TIME PIECES

Zen-ichi Inotsume, Yama-no-shita Suehiro-dori, Niigata-shi, Japan

Application August 21, 1956, Serial No. 605,313

Claims priority, application Japan October 31, 1955

1 Claim. (Cl. 58—121)

This invention relates to time pieces, and particularly to pallet type escape mechanism provided with a pallet which makes a balance staff or balance wheel oscillatable freely.

Heretofore, in a pallet type escape mechanism, there is provided a safety means which consists of a pallet guard pin and a safety roller to prevent the pallet from overbanking when an appreciably strong impulse is imparted to a balance staff oscillating freely. Although such a mechanism is suitable to the watch, it is impossible to keep accurate time by said mechanism for the following reasons. In order to keep accurate time in said mechanism, impulse is given to the balance staff from an escape wheel through the intermediary of a lever called pallet. Let a power of a mainspring be 100 and a power given to the escape wheel be 10, when impulse is subjected to the balance staff through the intermediary of the pallet by said power 10 of the escape wheel, power actually received by the balance staff will be 7 or 8, a power of 2 or 3 being lost. Therefore, if the power of the mainspring is relatively strong, the balance staff oscillates with a relatively long period. But if the power of the mainspring is relatively weak, the balance staff oscillates with a relatively short period resulting in that it is impossible to keep actually accurate time by such a watch.

On the other hand, a chronometer, or a gold spring type timekeeper is able to keep actually accurate time and suitable for a standard clock by virtue of the mechanism where power is transmitted directly from the escape wheel to the balance staff without any loss of power. It is impossible, however, to provide a perfect safety means because the escape wheel is regulated by a single jewel of the regulating lever when the balance staff oscillates freely. Therefore, the mechanism of the chronometer is not appropriate to make a small-sized portable time piece or a watch.

I have previously invented a pallet type timekeeper patented in the Japanese Patent Bureau under Patent No. 208,710 by which the merits of each of the above-mentioned two types of time piece are combined with each other and defects of each of them are overcome. The pallet type escape mechanism provided with a free regulating means invented by me comprises a pallet having an entrance jewel, an exit jewel, a fork slot, and a guard pin, impulse being given from an escape wheel directly to an impulse jewel fixed relative to a balance staff, the fork slot of the pallet being actuated once by a roller jewel mounted on a large roller fixed relative to said balance staff. The escape of the successive teeth of the escapement wheel is controlled alternately by the entrance and exit jewels as the balance staff oscillates. The pallet is prevented from overbanking by virtue of the relation between the guard pin and a small roller fixed on the balance staff, as shown in Fig. 11 appended herewith and referred to hereinafter.

It is possible in said mechanism invented by me to give impulse to the balance staff without any loss of power from the escape wheel and to keep the period of oscillation of the balance staff invariable. Thus efficiency of the mechanism doubles that of a known pallet type watch, keeping more accurate time. Furthermore, there is provided a safety means whereby the pallet is prevented from overbanking during the free oscillation of the balance staff by virtue of engagement of the guard pin of the pallet with the small roller fixed on the balance staff, the teeth of the escape wheel being alternately regulated by the entrance jewel and the exit jewel of the pallet, the fork of which is actuated, in turn, by the roller jewel mounted on the large roller fixed on the balance staff. By virtue of the above characteristics, it is possible to make inexpensively small-sized watches, and, of course, wall-clocks and table-clocks. Unfortunately, there is, however, a defect in accuracy for the reason that the free oscillation of the balance staff is obstructed due to the fact that the entrance jewel is too small, that is, the guard pin engages with the small roller as far as the balance staff oscillates freely as shown in Fig. 11.

The object of the present invention is to provide a time piece capable of keeping more accurate time.

I attain the object by mechanism in which the guard pin engages with no member during the free oscillation of the balance staff whereby said balance staff is capable of keeping an unvariable period of the oscillation, the fork being kept just by a banking pin by engagement of a tooth of the escape wheel with an entrance jewel characterized by a longer impulse face starting just before the impulse given by another tooth of the escape wheel directly to the impulse jewel, so as to keep the guard pin off the small roller during the free oscillation of the balance staff.

In describing the present invention reference will be made to the accompanying drawings in which:

Figure 1 is a fragmentary view of a timepiece showing the escape mechanism in side elevation;

Figures 2–10 are front elevational views showing the escapement in successive stages of the operating cycle; and Figure 11 is a view in front elevation showing a mechanism of the timekeeper formerly invented by me and patented in the Japanese Patent Bureau under Patent No. 208,710 in a corresponding condition in operation to that shown in Fig. 5 relating to the present invention.

Figure 5:
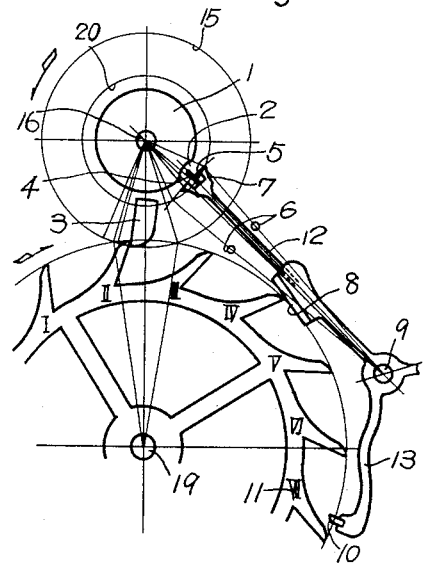

The pallet type escape mechanism provided with a pallet making a balance staff oscillatable freely according to the present invention comprises a pallet 13 fixed on a pallet arbor 9 held oscillatably by a pallet bridge 14, a balance wheel 15' fixed on a balance staff 16 held oscillatably by a bearing 17, a hairspring 18 fixed at the inner end by the balance staff 16 representing a first axis and at the outer end by a stud, an impulse jewel or impulse receiving member 3 also fixed to roller 15 on the balance staff 16, an escape wheel 11 fixed on an escape center 19, and a roller or drive member jewel 5 fixed on a large roller 20, as shown in Fig. 1. In addition, the pallet 13 comprises a larger entrance jewel 8, a smaller exit jewel 10, an arm 12 having a slot 7 and a guard pin 4, and a pallet arbor 9 representing a second axis, as shown in any of Figs. 2–10.

Figure 6:
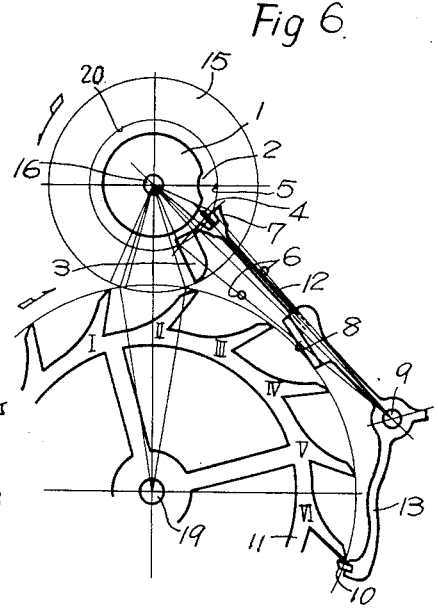
Figure 7:
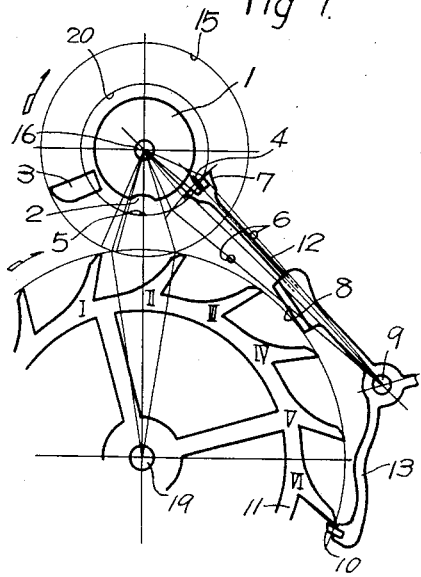
Figure 8:
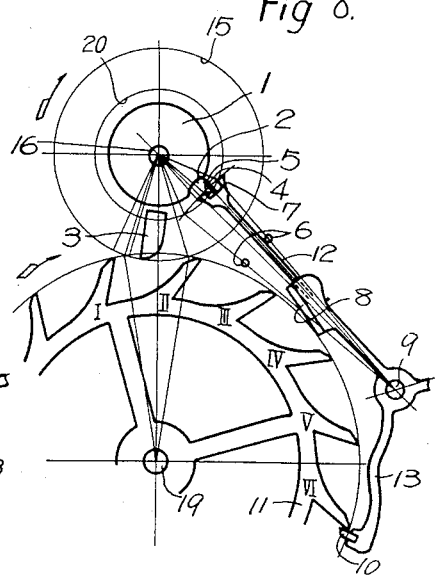

In operation, starting from a stationary state shown in Fig. 2, Fig. 3 shows the next state where a tooth IV of the escape wheel 11 is just almost released from the entrance jewel 8 by the action of the roller jewel 5 in the fork slot 7. Fig. 4 shows the next state where the tooth IV has been released from the entrance jewel 8 by the sufficient action of the roller jewel 5 within the fork slot 7 while impulse is almost given to the impulse jewel 3 by a tooth II of the escape wheel 11. Then the tooth II just giving the impulse to the impulse jewel 3 is shown by Fig. 5 wherein the tooth IV of the escape wheel 11 is pushing the entrance jewel 8 so as to locate the fork 12 just by a banking pin 6. In Fig. 6, impulse has been given to the impulse jewel 3 completely so as to render the balance staff 16 free to oscillate, the roller jewel 5 being apart from the fork slot 7 and the guard pin 4 being out of the safety roller crescent 2 of the small roller or safety roller 1 but being located at the periphery of the small roller 1 so as to prevent the pallet 13 from overbanking while a tooth VI of the escape wheel 11 is regulated by the exit jewel 10 and the fork 12 is located by the banking pin 6. Fig. 7 shows the balance staff 15 as having reached the end of a swing of the oscillation. In the Fig. 8, the next swing in the counter direction of the oscillation of the balance staff 16 has begun where the roller jewel 5 is just engaging in the fork 7 so as to release the tooth VI from the exit jewel 10. In Fig. 9, then the tooth VI is almost released from the exit jewel 10, while another tooth III is approaching to the entrance jewel 8. In Fig. 10, continuing the free oscillation of the balance staff 15, the tooth III of the escape wheel 11 has been regulated by the entrance jewel 8, said regulation being prevented from over-banking by virtue of the relation between the guard pin 4 and the small roller 1.

It is to be understood that the banking pin 6 must be fixed at such a position such that the roller jewel 5 can go into and out of the slot 7 of the fork 12 freely and the guard pin 4 never has contact with the periphery of the small roller 1 inasmuch as the fork 12 is engaged by said banking pin 6. Furthermore, the larger entrance jewel 8 must be pushed in such a manner that the same is pushed by a tooth, for example the tooth IV, of the escape wheel 11 from a position where said tooth IV is just released by said entrance jewel 8 to another position between the instant when said tooth IV is just released by said entrance jewel 8 and another instant when another tooth, for example the tooth VI, becomes locked by the exit jewel 10, the last-named position being such that, when the entrance jewel 8 has been pushed as above stated, the fork 12 being fixed relative to said entrance jewel 8 is engaged by the banking pin 6 as above stated and the exit jewel 10 also fixed relative to said entrance jewel 8 is in position to lock the tooth VI. Therefore, the guard pin 4 is prevented from having contact with the periphery of the small roller 1 by the push given to the entrance jewel 8 from a tooth for example the tooth IV so as to keep the balance staff oscillatable freely, and at the same time the fork 12 is prevented from too wide a swing thereof by the banking pins 6 so as to be able to make the roller jewel 5 go into and out of the slot 7 of the fork 12 as usual.

It is also to be seen that the roller jewel 5 must not be accelerated by the slot 7, that is, the slot 7 of the fork 12, which is being made to swing in the clockwise direction by the push given to the entrance jewel 8 from a tooth, for example the tooth IV, must not act on the roller jewel 5. Of course, if the roller jewel 5 is accelerated by the slot 7, it is clear that the balance staff cannot be kept oscillatable freely. Therefore, the entrance jewel 8 must be pushed by a tooth, for example the tooth IV, in such a manner that the slot 7 swings not faster than, and preferably at the same peripheral speed as, the roller jewel 5 simultaneously with the swing of the latter.

I claim:

In a pallet type escape mechanism for a time piece, in combination, an escape wheel having a plurality of teeth equally distributed along the periphery thereof; a balance staff mounted for oscillation about a first axis adjacent said escape wheel and having an impulse receiving member adapted to be engaged by said teeth of said escape wheel during the turning of the latter so as to be turned in one direction, a drive member spaced from said axis and moving during oscillation of said balance staff along a given path, and a small roller mounted concentrically about said first axis; a pallet mounted adjacent said escape wheel for tilting movement about a second axis spaced from and substantially parallel to said first axis and having an entrance jewel and an exit jewel spaced from each other and located respectively on opposite sides of said second axis and adapted to alternately engage said teeth of said escape wheel to regulate the rotation thereof, said entrance jewel having a locking face and having a cam face directed towards the crest of said teeth to be engaged by the crest of one of said teeth after said one tooth is disengaged from said locking face, said cam face being long enough to remain in engagement with said one tooth during rotation of said escape wheel until another tooth thereof is ready to be locked by said exit jewel, said exit jewel having a locking face toward the crest of said teeth to be engaged by one of said teeth after another of said teeth is disengaged from said cam face of said entrance jewel, said pallet having an arm extending with the free end thereof in the path of said drive member to be engaged thereby during the oscillation of said balance staff so that the pallet will be tilted about said second axis when said balance staff oscillates about said first axis; a guard pin mounted on said free end of said arm and projecting towards the periphery of said roller; and a pair of banking pins located spaced from each other and respectively on opposite sides of said arm of said pallet to limit the tilting movement thereof, said arm being moved during engagement of said one tooth with said cam face of said entrance jewel toward one of said banking pins so that said guard pin is kept out of contact with the periphery of said roller during free turning of said balance staff in said one direction.

References Cited in the file of this patent
UNITED STATES PATENTS 1,091,261    Walker _____ Mar. 24, 1914

FOREIGN PATENTS 101,849    Switzerland _____ Nov. 16, 1923